United States Patent [19]
Wiesheu et al.

[11] Patent Number: 5,772,707
[45] Date of Patent: Jun. 30, 1998

[54] PROCESS AND APPARATUS FOR METHANOL REFORMING

[75] Inventors: Norbert Wiesheu, Guenzburg; Detlef zur Megede, Bubesheim; Rainer Autenrieth, Erbach, all of Germany

[73] Assignee: Daimler-Benz AG, Germany

[21] Appl. No.: 673,085

[22] Filed: Jul. 1, 1996

[30] Foreign Application Priority Data

Jul. 22, 1995 [DE] Germany ................. 195 26 886.5

[51] Int. Cl.⁶ ..................................................... C01B 3/02
[52] U.S. Cl. ........................... 48/197 R; 48/61; 48/127.9
[58] Field of Search ................. 48/61, 127.9, 197 R; 252/373

[56] References Cited

U.S. PATENT DOCUMENTS

| | | | |
|---|---|---|---|
| 4,088,450 | 5/1978 | Kosaka et al. | 48/197 R |
| 4,865,624 | 9/1989 | Okada | 48/61 |
| 5,518,705 | 5/1996 | Buswell et al. | 423/437 M |

FOREIGN PATENT DOCUMENTS

| | | |
|---|---|---|
| 41 93 026 T1 | 10/1993 | Germany . |
| 60-246202 | 12/1985 | Japan . |
| 61-183102 | 8/1986 | Japan . |
| 2-18302 | 1/1990 | Japan . |

*Primary Examiner*—Tae Yoon
*Attorney, Agent, or Firm*—Evenson, McKeown, Edwards & Lenahan, P.L.L.C.

[57] ABSTRACT

Process and apparatus for methanol reforming in producing hydrogen gas for electric vehicle fuel cells in which the gas mixture to be reformed is passed through a catalyst-containing reaction compartment. The active length and/or the active inlet cross-section of an intake-side reaction compartment section which is temperature-controlled for high methanol conversion can be set as a function of the throughput of gas mixture to be reformed. Thereby, an essentially constant residence period of the gas mixture to be reformed results in the reaction compartment section which is temperature-controlled for high methanol conversion. The methanol reforming may thus be carried out even in the case of markedly fluctuating throughputs of gas mixture to be reformed with a constant level of methanol conversion rate and constantly low formation of undesirable carbon monoxide.

6 Claims, 3 Drawing Sheets

PROCESS AND APPARATUS FOR METHANOL REFORMING

BACKGROUND AND SUMMARY OF THE INVENTION

The present invention relates to a process for methanol reforming, in which the gas mixture to be reformed is passed through a catalyst-containing reaction compartment, and to an apparatus suitable for carrying out this process.

A known reforming process is used, in particular, for producing hydrogen gas. The methanol, for example together with water, is reacted in a hot-steam reformer to form hydrogen and carbon dioxide. The carbon dioxide, together with the hydrogen, in turn being in a reaction equilibrium with water and carbon monoxide (CO). Methanol conversion rate and carbon monoxide production are therefore factors which are connected to one another via, among other things, the temperature-dependent reaction equilibria. That is, depending on the methanol conversion rate set by the process technology, a certain amount of carbon monoxide results when the currently known catalyst materials are used.

In many instances, the carbon monoxide is an undesirable by-product because of its toxicity for the environment and the catalyst materials used, and must frequently be removed in a complex manner. Whereas for an industrial large-scale process, under steady-state conditions, an optimum operating point can still be maintained comparatively simply, under non-steady-state conditions, particularly, which means, principally, throughputs varying with time of the gas mixture to be reformed and associated changes in the catalyst space velocity in the reformer, operating phases may occur in which a relatively large amount of carbon monoxide is formed. Non-steady-state conditions of this type exist, for example, in non-steady-state applications of hydrogen as an energy source, such as for peak current generation and in motor vehicle drive units, in which it is desired to have recourse to methanol as a liquid source of hydrogen in order not to require direct storage of hydrogen gas.

Because the methanol decomposition reaction proceeds more vigorously endothermically and the carbon monoxide formation from carbon dioxide proceeds more feebly endothermically, to minimize the CO formation, it has already been repeatedly proposed to establish a temperature gradient along the reaction path of the gas mixture in the reaction compartment. The temperature decreases from the inlet side to the outlet side of the reaction compartment.

Thus, in U.S. Pat. No. 4,865,624, a process and an apparatus for methanol reforming are described in which, by suitable heating circuits, an inlet-side half of a catalyst-containing reaction compartment through which the gas mixture to be reformed can flow is kept at a higher temperature in a co-current flow process, and a subsequent outlet-side half is kept at a lower temperature in a counter-current flow process. This is said to promote the methanol conversion in the intake stage and the conversion of carbon monoxide into carbon dioxide in the exit stage.

In a similar manner, DE 41 93 026 T1 describes the establishment of three temperature zones, situated one after the other, of approximately 300° C. approximately 275° C. and approximately 225° C. along the reaction path in a methanol reformer. In JP 63-50302(A), a stepwise temperature decrease in the reaction compartment of a methanol reformer along the gas mixture flow path to decrease CO formation is likewise specified. In all of these conventional processes, the parameters of the reforming reaction are preset independently of the respective instantaneous throughput of gas mixture to be reformed.

An object of the present invention is to provide a process and an apparatus suitable for carrying out that process, by way of which methanol, even in the case of varying throughputs of gas mixture to be reformed (e.g., as a result of fluctuating hydrogen gas requirement) can be reformed so that the reformate leaving the reaction compartment contains relatively little carbon monoxide.

This problem has been solved by a process in which passing the gas mixture to be reformed through a catalyst-containing reaction compartment, and setting at least one of active length and active inlet cross-section of an intake-side reaction compartment section which is temperature controlled to achieve a high methanol conversion rate as a function of the respective throughput of gas mixture to be reformed. As a result, a residence period of the gas mixture remains essentially constant in the intake-side reaction compartment section.

An apparatus which utilizes the process of the present invention has a device for variable setting of the heating fluid volumetric flow rate in the heating fluid circuit, and is configured so as to actuatable as a function of throughput of gas mixture to be reformed. Thereby, at least one of active length and active inlet cross-section of an intake-side reaction compartment section which is temperature controlled to achieve a high methanol conversion rate as a function of the respective throughput of gas mixture to be reformed. As a result, a residence period of the gas mixture remains essentially constant in the intake-side reaction compartment section or a heating space which is in operative thermal contact with an intake-side reaction compartment section which is temperature-controlled for high methanol conversion.

The heating space in the present invention is delimited by a wall which can be slid in parallel to a direction of flow of the gas mixture to be reformed such that at least one of active length and active inlet cross-section of an intake-side reaction compartment section which is temperature controlled to achieve a high methanol conversion rate as a function of the respective throughput of gas mixture to be reformed, Consequently, a residence period of the gas mixture remains essentially constant in the intake-side reaction compartment section. Alternatively, a device optionally intake-side opens or blocks a variable number of the reactor tubes so that at least one of active length and active inlet cross-section of an intake-side reaction compartment section which is temperature controlled achieves a high methanol conversion rate as a function of the respective throughput of gas mixture to be reformed and a residence period of the gas mixture remains essentially constant in the intake-side reaction compartment section.

With regard to the process, the active length of the intake-side reaction compartment section, which is temperature-controlled to achieve a high methanol conversion rate, and/or its active cross-section is variable as a function of the particular throughput of gas mixture to be reformed such that the residence period of the gas mixture to be reformed remains essentially constant in the reaction compartment section temperature-controlled to achieve a high methanol conversion rate. Thereby, even under non-steady-state operating conditions, an optimum operating state with respect to minimum CO formation can be set in the methanol reformer.

Underlying the process of the invention is the experimentally confirmed discovery that the methanol decomposition reaction, on one hand, and the CO formation reaction, on the other hand, proceed at different speeds at different values of parameters such as reaction compartment temperature and residence period in the reaction compartment of the gas mixture to be reformed. Thus, for each combination of reaction compartment temperature and residence period, an operating state optimum exists having high methanol conversion and low CO formation.

The process of the invention always keeps the operating point of the methanol reformation at this optimum operating state, as a function of the possibly fluctuating gas mixture throughput. Experimentally confirmed considerations of the reaction procedure indicate that, in the methanol reformation, the methanol is first reacted and carbon monoxide is only formed to an increasing extent in an exit-side part of the reactor path length no longer utilized for methanol conversion at low throughputs.

By matching the active length of the intake-side reaction compartment section, which is temperature-controlled to achieve a high methanol conversion rate, to the respective instantaneous gas mixture throughput, it is therefore always possible by the process of the present invention to avoid such a downstream reaction compartment section which is heated to a higher temperature and to which virtually no methanol passes any more and which causes CO formation to an increased extent. Additionally, or alternatively, to this length matching, the residence period of the gas mixture to be reformed can be kept essentially constant, independently of the respective gas mixture throughput, in the intake-side reaction compartment section which is temperature-controlled. A high methanol conversion rate is thereby achieved by the fact that the active intake-side reaction compartment cross-section is changed as a function of the respective gas mixture throughput.

According to another feature of the process according to the present invention, the length of the intake-side reaction compartment section active for the methanol conversion is matched by the fact that the volumetric flow rate of the heating fluid used for the temperature control of the reaction compartment is set appropriately, and the associated heating fluid circuit is operated in co-current flow. That is, the heating fluid flows in the area of thermal contact with the reaction compartment in parallel to the gas mixture to be converted. The temperature gradient along the reaction compartment can thus be adjusted, and the length of the reaction compartment section which is temperature-controlled can be adjusted to achieve a high methanol conversion rate.

In another embodiment of the process according to the present invention, the length of the intake-side reaction compartment section is matched by the length of the part of the heating fluid circuit in thermal contact with the reaction compartment being varied suitably.

According to another aspect of the process of the present invention, the intake-side reaction compartment cross-section active for high methanol conversion is changed by optionally individually releasing or blocking reaction part-compartments which are separate from each other and arranged in parallel.

With the apparatus according to the present invention, the volumetric flow rate of the heating fluid serving for the temperature control of the reforming reaction compartment can be advantageously altered in the associated heating fluid circuit via the device provided for this purpose, which enables the above-described process to be carried out.

The apparatus according to the present invention can have the heating fluid circuit for the temperature control of the reaction compartment which contains a temperature-control compartment in thermal contact with the reaction compartment. The temperature-control compartment is delimited by a wall which can be displaced in parallel to the direction of flow of the gas mixture to be reformed. By displacing the wall, the length of the thermal contact between temperature-control compartment and reaction compartment can therefore be set. Thus, for example, the process of the present invention can be carried out insofar as matching the length of the intake-side reaction compartment section by suitably varying the length of the part of the heating circuit in thermal contact with the reaction compartment.

The apparatus can also be configured with a tube-bundle reformer, in which a desired number of reactor tubes can be released or blocked to carry out, e.g., the process of changing the intake-side reactive compartment cross-section.

BRIEF DESCRIPTION OF THE DRAWINGS

These and other objects, features and advantages of the present invention will become more readily apparent from the following detailed description thereof when taken in conjunction with the accompanying drawings wherein.

DETAILED DESCRIPTION OF THE DRAWINGS

Figure 1:
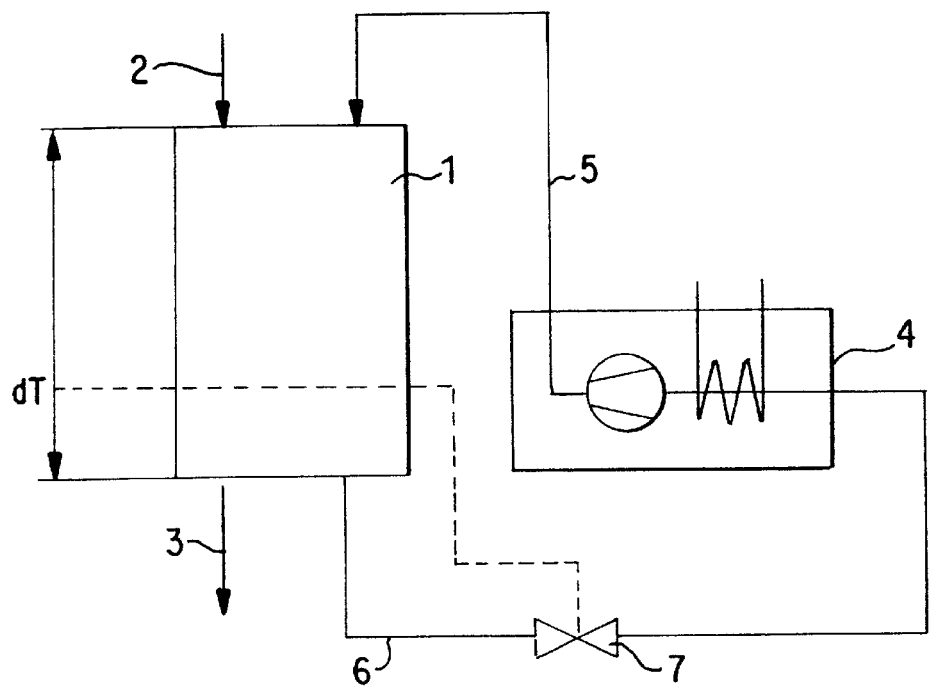
FIG. 1 is a schematic diagram of a methanol reformer having a heating fluid circuit equipped with a mainstream control valve.

The methanol reforming plant schematically shown in FIG. 1 contains a known reformer vessel 1 which includes a reaction compartment into which a methanol/steam mixture 2 can be introduced on the intake side in order for being subjected to a hot-steam reforming reaction. The usual reaction conditions can essentially be set, e.g., the pressure and the order of magnitude of the temperature of the reaction compartment and the choice of suitable catalyst materials in the reaction compartment. The construction of the reaction compartment can also be one of the structures known in tube-bundle reformers or plate reformers, without further details needing to be considered here. At the exit of the reaction compartment, the reformate 3, which essentially comprises hydrogen gas, then exits.

In order to ensure a maximum methanol conversion rate of more than 95% and, at the same time, to minimize the accompanying high CO formation, a temperature gradient dT is established, by way of a thermal oil heating circuit, over the length of the reaction compartment through which the methanol/steam mixture flows. The temperature gradient dT is sized so that the reaction area of significant CO formation, which is situated downstream of the initial reaction area of high methanol conversion, is already at a comparatively low temperature level, thereby suppressing CO formation.

Depending on the load (i.e. depending on the requirement of hydrogen gas produced), e.g. for a motor vehicle fuel cell downstream of the reformate exit 3 of the reformer vessel 1 and associated reformate gas production, the temperature gradient is set appropriately between the higher temperature at the reaction compartment intake side and the lower temperature at the reaction compartment exit side. For this purpose, the thermal oil heating circuit contains a heating and circulation unit 4 having a heating device and circulation pump. This unit 4 heats the thermal oil to the temperature desired at the inlet of the reformer vessel 1 and transports the thermal oil via a feed line 5 to a co-current flow heat exchanger unit (which need not be shown in further detail) in the reformer vessel 1. The heat exchanger unit is in thermal contact with the reaction compartment, and the thermal oil flows through the heat exchanger in the same flow direction as the methanol/steam mixture 2 to be reformed flows through the reaction compartment.

From the exit of the heat exchanger unit, a return line 6 of the heating circuit leads back to the heating and circulation unit 4. A control valve 7 which can be actuated via a pneumatic motor or the like is provided into the return line 6. Because the reforming reaction proceeds endothermically, heat is removed from the thermal oil circulating through the heat exchanger unit so that, along the reaction path in the reformer vessel 1, the temperature gradient dT is formed, which also primarily depends on the throughput of methanol/steam mixture and on the volumetric flow rate of the circulating thermal oil.

The flow velocity of the methanol/steam mixture 2 to be reformed fluctuates in the reaction compartment as a function of the magnitude of the instantaneous reformer loading, i.e. the instantaneous amount of reformate 3 removed. Thus, the residence period of the methanol/steam mixture per unit length of the reaction compartment fluctuates. Accordingly, for a constant level of methanol conversion rate for a higher reformer loading, a higher active length of an intake-side reaction compartment section is necessary in which the methanol conversion essentially takes place.

The reformer plant of FIG. 1 takes the foregoing into account in that the control valve 7, by which the volumetric flow rate of the thermal oil circulating through the heating circuit can be controlled, can be adjusted as a function of the measured temperature gradient dT along the reaction compartment, as symbolized by the dashed line. At a higher load requirement, i.e. higher reformate withdrawal, the methanol/steam mixture 2 flows more rapidly through the reaction compartment, so that a greater intake-side reaction compartment length is necessary for effective methanol 25 conversion. Thus a shallower temperature gradient dT is necessary, with an increased heat requirement resulting, moreover, due to the endothermic reforming reaction. The excessively rapid temperature decrease which threatens for this reason in the intake-side reaction compartment section is then counteracted by the control valve 7 being further opened, Sc, that the volumetric flow rate increases in the thermal-oil heating circuit. Thereby, the increased heat requirement for the reforming reaction can be covered and, at the same time, because of the higher flow velocity of the thermal oil in the heat exchanger as well, the intake-side reaction compartment section can be appropriately extended, so that its length and temperature are just sufficient to convert the methanol at the highest possible rate.

If, in contrast, the reformer loading falls, the methanol/steam mixture throughput decreases and the temperature gradient dT thus tends to decrease. The control valve 7 is thus activated in the closing direction, so that the thermal-oil volumetric flow rate in the heating circuit and, accordingly, the active length of the intake-side reaction compartment section serving for the methanol conversion decrease. The temperature gradient dT over the reaction compartment length can therefore be set appropriately as a function of reformer loading and accompanying reformate gas production in this reforming plant. Hence, independently of the respective throughput of methanol/steam mixture, an essentially constant residence period of the same is always maintained in an intake-side reaction compartment section which is heated to a higher temperature and is suitable for high methanol conversion, without decreased methanol conversion occurring because of an insufficient length of this section or increased CO formation occurring because of an excessive length of this section.

Figure 2:
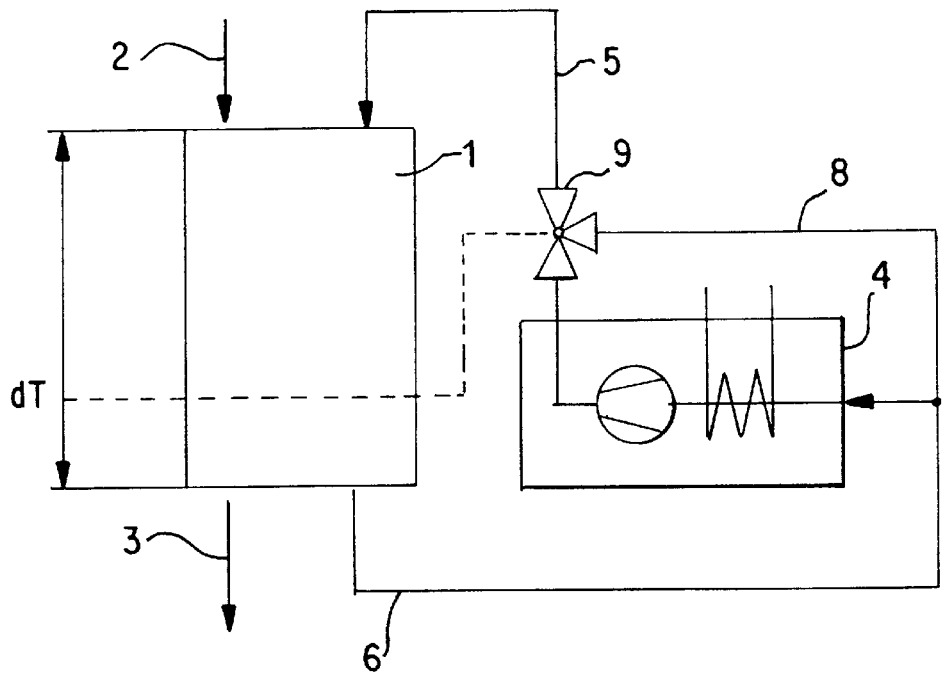
FIG. 2 is a schematic diagram of a methanol reformer having a heating fluid circuit equipped with a by-pass line and control valve.

FIG. 2 shows a reformer plant whose structure and function essentially correspond to those of FIG. 1, and for that reason, the reference numbers used in FIG. 1 are used to describe similar elements in the following description of FIG. 2. The plant of FIG. 2 is modified with respect to that of FIG. 1 to the extent that a by-pass line 8 bypassing the heating and circulation unit 4 and a three-way valve 9 are provided instead of a control valve in the return line 6 of the thermal-oil heating circuit. The by-pass line 8 is brought on the one side to the three-way valve 9, and the exit line of the heating and circulation unit 4 is brought on the other side to the three-way valve 9. The three-way valve feeds an adjustable mixing proportion from the two feed lines into the thermal-oil feed line 5 to the co-current flow heat exchanger unit in the reformer vessel 1.

As indicated by a dashed line, the three-way valve 9 is in turn triggered by the measured temperature difference dT between the intake and exit side of the reaction compartment in the reformer vessel 1. Because this means a control of the volumetric flow rate of freshly heated thermal oil into the heat exchanger, the thermal-oil heating circuit built up in this way is functionally completely equivalent to that of FIG. 1. In FIG. 2, as also in the plant of FIG. 1, the intake-side reaction compartment length active for the methanol conversion can be matched to the reformer loading via the setting of a suitable temperature gradient dT by appropriate control of the thermal-oil volumetric flow rate in the heat exchanger.

Figure 3:
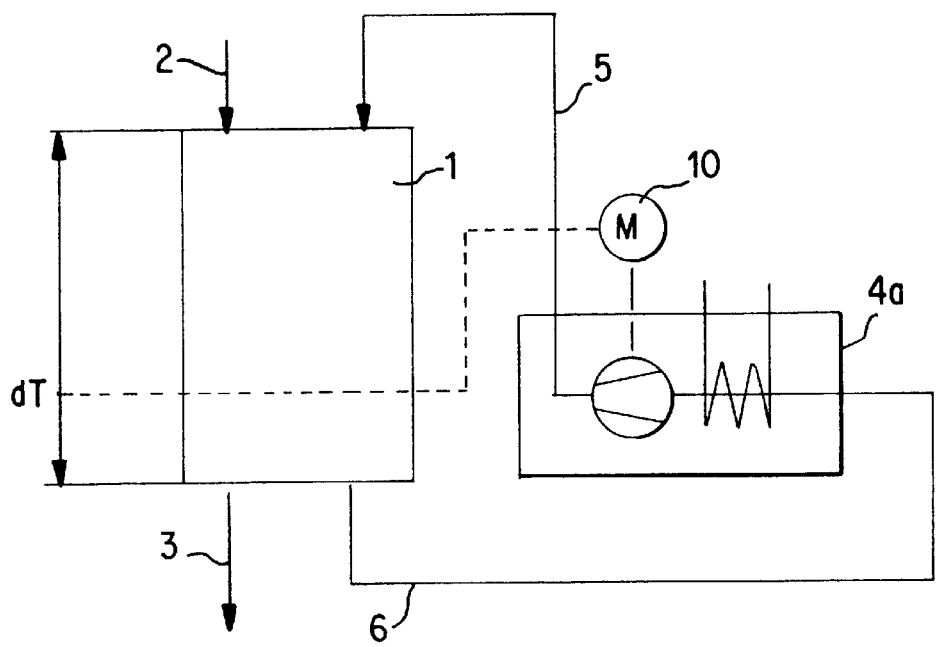
FIG. 3 is a schematic diagram of a methanol reformer having a heating fluid circuit equipped with pump speed controller.

Another embodiment of the reformer plant of FIG. 1 is shown in FIG. 3, with functionally identical parts being provided with the same reference numbers used in FIG. 1. In this other methanol reformer embodiment also, control of volumetric flow rate of thermal oil circulating in a heating fluid circuit achieves a desired temperature gradient between the intake and exit side of the reaction compartment in the reformer vessel 1. Instead of the volumetric flow rate of the thermal oil being controlled via an actuatable control valve in the return line 6 of the heating circuit as in the reformer of FIG. 1, however, in the reformer of FIG. 3, the volumetric flow rate of the thermal oil is controlled by changing the pump speed of the pump provided in a circulation unit 4a, which is modified in this respect, of the heating circuit.

For the foregoing purpose, a pump speed control element 10 is connected to this pump, which in turn can be actuated with respect to the measured temperature gradient dT by the control signal, as represented by the dashed line. If there is a higher requirement for reformate 3 and thus a higher throughput of gas mixture 2 to be reformed, the pump speed is increased, so that the thermal oil flows more rapidly through the heat exchanger in the reformer vessel 1 and a greater effective length of the reaction compartment is kept at an elevated temperature for high methanol conversion.

Correspondingly, the pump speed is decreased if the reformer loading becomes smaller.

Figure 4:
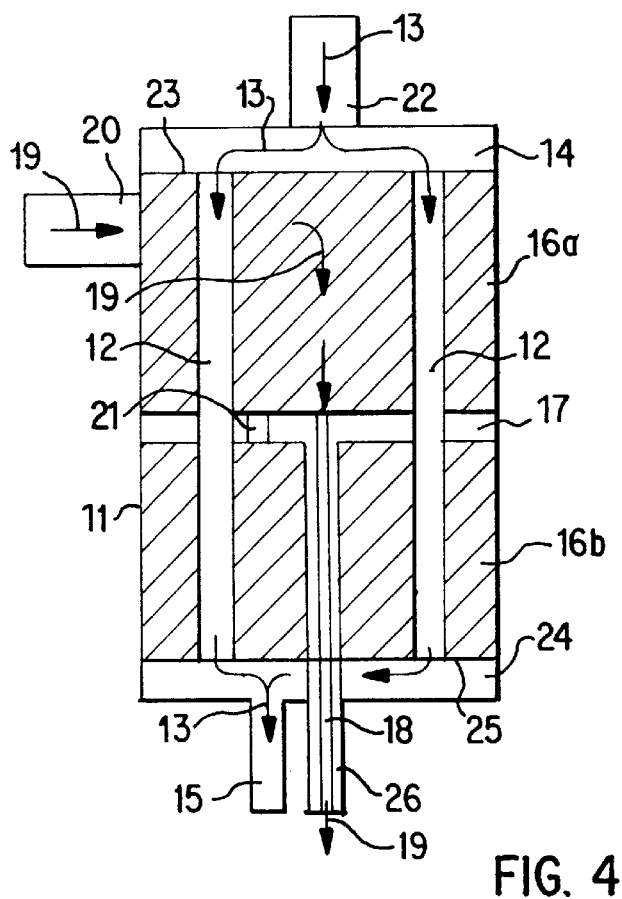
FIG. 4 is a cross-sectional elevation view of a methanol reformer having an active temperature-controlled compartment of variable length.

Whereas, in the three methanol reformers described above, the temperature gradient dT over the reaction compartment length is matched to the reformer loading by controlling the rate of throughput of heated thermal oil, a methanol reformer unit of the type shown in FIG. 4 sets the length of the intake-side reaction compartment section which is temperature-controlled for high methanol conversion by changing the length of the thermal contact area between the influent thermal oil at elevated temperature and the reaction compartment. This methanol reformer is a so-called tube-bundle reformer, in which the reaction compartment comprises a plurality of reaction tubes 12 arranged parallel to one another.

The tubes 12 are situated within a reformer vessel 11, to one end of which is fed, via an inlet 22, the gas mixture 13 to be reformed. The incoming gas mixture 13 is distributed onto the various reaction compartment tubes 12 via an intake-side distributor gas space 14 of the reformer vessel 11. The reformate 13' exiting on the other side of the tubes 12 passes into an exit-side gas collection space 24 of the reformer vessel 11, from where it leaves the reformer vessel 11 via an outlet 15.

Towards the interior of the reformer vessel 11, the distributor gas space 14 and the gas collection space 24 are each delimited by a partition 23, 25. The space between these two partitions 23, 25 in the reformer vessel 11 and outside the reformer tubes 12 forms a space filled with thermal oil which is partitioned into an intake-side half 16a and an exit-side half 16b by way of an axially slidable piston 17 having a molded-on piston rod 26 leading out axially from the reformer vessel 11.

The thermal oil 19 serving as heating fluid enters via an inlet 20 on the reformer vessel 12 into the intake-side oil space half 16a. From there, it exits again from the reformer vessel 11 via a channel 18 which is introduced into the piston 17 and the piston rod 26 so as to run axially. The remaining components of the thermal-oil heating circuit are not shown here and can be implemented, e.g., in one of the ways shown in FIGS. 1 to 3. Consequently, the active thermal oil circulation 19 does not lead through the exit-side oil space half 16b, and the thermal oil situated there and, therefore, the exit-side reaction compartment section enclosed thereby, assumes a lower ambient temperature. The actively circulating thermal oil 19 keeps the intake-side oil compartment half 16a, and thus a corresponding intake-side- reaction compartment length, at an elevated temperature.

By axially sliding the piston 17 through the reaction compartment 12 as a function of the gas mixture throughput, the length of the intake-side reaction compartment section which is temperature-controlled for high methanol conversion can therefore be set to the respective appropriate length at which the most complete methanol conversion just occurs, but no noticeable Co formation occurs. A narrow connection channel 21 between the intake-side and exit-side oil space halves 16a, 16b enables the thermal oil transfer, which is necessary for the sliding of the piston 17, from the diminishing to the enlarging oil space half, without causing a significant heat transfer from the intake-side 16a to the exit-side oil space half 16b.

Figure 5B:
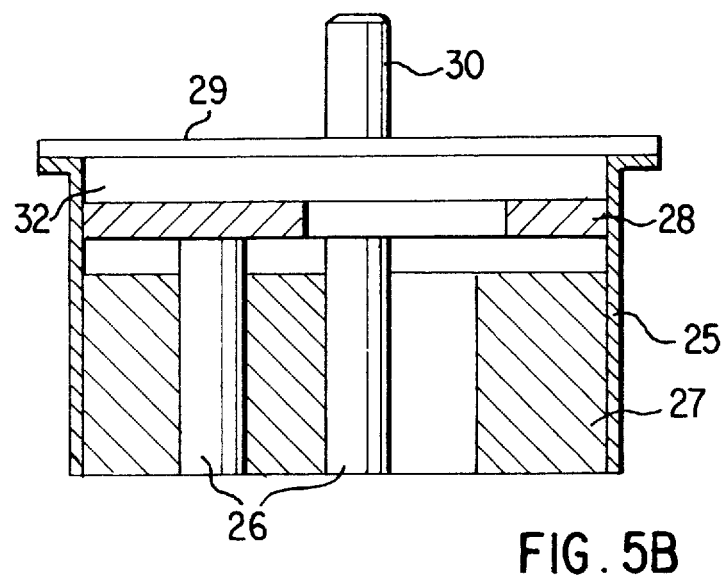
FIGS. 5A and 5B are, respectively, a plan view of the intake side of a tube-bundle reformer having an intake-side rotating opening disc and a cross-sectional view of the intake-side area along line A—A of FIG. 5A.
Figure 5A:
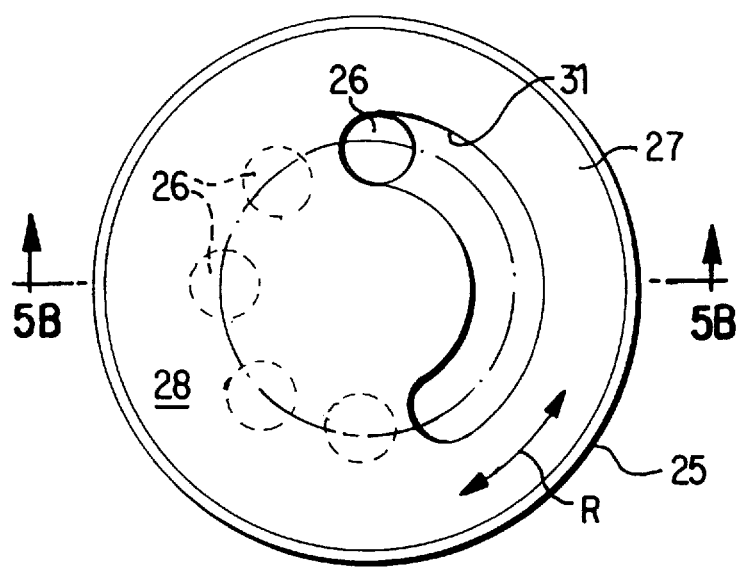

In the methanol reformer of FIGS. 5A and 5B shown in an upper area with its reformer vessel 25, the methanol-converting reaction compartment zone is matched to the reformate demand by changing the active intake-side reaction compartment cross-section. Thereby, independently of the instantaneous gas mixture throughput, an approximately constant gas mixture flow velocity is maintained. Accordingly, the residence period of the gas mixture in an intake-side reaction compartment section which is temperature-controlled for high methanol conversion is kept essentially constant.

This methanol reformer is, in turn, configured as a tube-bundle reformer and contains six reaction tubes 26. These are arranged in parallel to one another at an equidistant spacing such that their longitudinal axes lie on a collective cylindrical half shell, as seen in FIG. 5A. The reformer vessel 25 is closed on the intake-side by a cover 29 into which an inlet 30 for the gas mixture to be reformed is introduced. This inlet 30 opens out into an intake-side distributor gas space 32. Towards the interior of the reformer vessel 25, the distributor gas space 32 is delimited by a rotatably mounted rotating opening disc 28, into which is introduced a curved recess 31 in such a way that, by rotating the rotating opening disc 28 clockwise or counterclockwise, as indicated by the double arrow R, optionally all six or only some of the end inlet orifices of the reaction tubes 26 lie in this curved recess area 31. Gas mixture can flow into each of those reaction tubes 26 whose inlet orifices lie in the recessed curve area 31 of the rotating opening disc 28, whereas the remaining reaction tubes 26 are covered on the inlet side by the rotating opening disc 28. By rotating the rotating opening disc 28, therefore, the number of reaction tubes 26 through which the gas mixture to be reformed actively flows may be set. In the situation shown in FIG. 5, e.g., just one of the six reaction tubes 26 is open.

In the foregoing manner, the entire active reaction compartment cross-section can be matched to the respective existing gas mixture throughput. At a higher reformer loading, i.e. higher throughput, more reaction tubes 26 are opened, whereas at lower reformer load, more reaction tubes 26 are closed. Suitable control of the rotating opening disc 28 ensures that, independently of the fluctuating gas mixture throughput, the flow velocity of the gas mixture to be reformed remains roughly constant in the reaction tubes 26. It is thus not necessary to change the length of the intake-side reaction compartment zone which is temperature-controlled for a high methanol conversion rate, if the reformer loading changes, for which reason, in this reformer, the tube bundle 26 is enclosed on a fixed length by a thermal-oil heating space 27, which is only shown in its reformer-intake-side part, and into which heated, circulating thermal oil enters, analogously to the above-described examples.

The residence period of the gas mixture in the intake-side reaction compartment section surrounded by the heating space 27, which remains constant because of the constant flow velocity, independently of the respective instantaneous gas mixture throughput, ensures, even in the case of fluctuating reactor load, that the intake-side reaction compartment length which is heated to a higher temperature always corresponds to the length which is required for high methanol conversion, without an excessive length occurring, which would cause higher CO formation.

Of course, in addition to the above-described embodiments, further modifications can be implemented without departing from the scope of the present invention. For example, instead of the described tube-bundle reformers having an exit side opposite to the inlet side, U-tube bundle reformers or plate reformers can also be used. Furthermore, in addition to the use of thermal oil as heating fluid, any other suitable heat transport medium in liquid and/or gaseous form can also be used. Finally, it direct heating can be achieved by using a burner or a catalytic burner.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for methanol reforming, comprising the steps of passing the gas mixture to be reformed through a catalyst-containing reaction compartment, and setting at least one of active length and active inlet cross-section of a temperature-controlled intake-side reaction compartment section capable of a high methanol conversion rate as a function of the respective throughput of gas mixture to be reformed such that a residence period of the gas mixture remains essentially constant in the intake-side reaction compartment section.

2. The process according to claim 1, wherein the step of setting the active length of the intake-side reaction compartment section occurs by varying a temperature gradient produced by a heating fluid circuit in the reaction compartment via controlling volumetric flow rate of the heating fluid as a function of the gas mixture throughput.

3. The process according to claim 1, wherein the active length of the intake-side reaction compartment section is set by varying a length of a part of the heating fluid circuit in thermal contact with the reaction compartment as a function of the gas mixture throughput.

4. The process according to claim 1, wherein the step of setting the active intake-side reaction compartment cross-section occurs by one of opening and blocking reaction part-compartments arranged parallel and separately from one another.

5. The process according to claim 4, wherein the step of setting the active length of the intake-side reaction compartment section occurs by varying a temperature gradient produced by a heating fluid circuit in the reaction compartment via controlling volumetric flow rate of the heating fluid as a function of the gas mixture throughput.

6. The process according to claim 4, wherein the active length of the intake-side reaction compartment section is set by varying a length of a part of the heating fluid circuit in thermal contact with the reaction compartment as a function of the gas mixture throughput.

* * * * *